(12) United States Patent
Levit et al.

(10) Patent No.: US 7,399,379 B2
(45) Date of Patent: Jul. 15, 2008

(54) PROCESS OF ATTACHING REINFORCING PLY TO PLY CONTAINING MICA-RICH AND MICA-POOR FACES

(75) Inventors: Mikhail R. Levit, Glen Allen, VA (US); Laurence N. Bascom, Signal Mountain, TN (US)

(73) Assignee: E.I. du Pont de Nemours and Company, Wilmington, DE (US)

( * ) Notice: Subject to any disclaimer, the term of this patent is extended or adjusted under 35 U.S.C. 154(b) by 192 days.

(21) Appl. No.: 11/210,990

(22) Filed: Aug. 24, 2005

(65) Prior Publication Data

US 2006/0019081 A1 Jan. 26, 2006

Related U.S. Application Data

(62) Division of application No. 10/318,964, filed on Dec. 13, 2002, now Pat. No. 6,991,845.

(51) Int. Cl.
*D21H 27/38* (2006.01)
*D21H 17/68* (2006.01)
*B32B 7/02* (2006.01)
*B31F 5/00* (2006.01)

(52) U.S. Cl. ............... 162/125; 162/103; 162/128; 162/132; 162/138; 162/205; 162/206; 162/207; 162/181.6

(58) Field of Classification Search ......... 162/123–133, 162/181.1, 181.6, 204–207, 103, 115, 138; 428/212, 218, 324, 458, 469; 174/110 R; 156/60, 62.2, 219–220; 264/112–113, 127
See application file for complete search history.

(56) References Cited

U.S. PATENT DOCUMENTS

| | | | | |
|---|---|---|---|---|
| 1,515,821 A * | 11/1924 | Avery | ................ | 162/132 |
| 1,921,757 A * | 8/1933 | Kienle et al. | ................ | 162/123 |
| 2,447,161 A * | 8/1948 | Coghill | ................ | 162/290 |
| 2,620,851 A * | 12/1952 | Brown | ................ | 442/278 |
| 2,712,512 A * | 7/1955 | Biefeld et al. | ................ | 442/256 |
| 2,810,425 A * | 10/1957 | Heyman | ................ | 428/221 |
| 3,007,840 A * | 11/1961 | Wilcox | ................ | 162/101 |
| 3,080,272 A * | 3/1963 | Jackson | ................ | 162/157.3 |
| 3,168,434 A * | 2/1965 | Heyman | ................ | 162/124 |
| 3,549,789 A * | 12/1970 | Haroldson | ................ | 174/122 R |
| 3,756,908 A | 9/1973 | Gross | | |
| 3,779,860 A * | 12/1973 | Oshida et al. | ................ | 162/129 |
| 4,107,358 A * | 8/1978 | Bayles et al. | ................ | 427/379 |
| 4,239,998 A * | 12/1980 | Hakamada et al. | ................ | 310/45 |
| 4,259,398 A * | 3/1981 | Seino et al. | ................ | 442/334 |
| 4,286,010 A | 8/1981 | Staley et al. | | |
| 4,374,892 A * | 2/1983 | Roberts | ................ | 442/33 |
| 4,481,060 A | 11/1984 | Hayes | | |
| 4,559,264 A * | 12/1985 | Hoda et al. | ................ | 428/324 |
| 4,576,856 A * | 3/1986 | Kuwajima et al. | ................ | 442/296 |
| 4,606,785 A * | 8/1986 | Zeise | ................ | 156/305 |
| 4,683,162 A * | 7/1987 | Sklarski et al. | ................ | 428/182 |
| 4,752,355 A | 6/1988 | Provost | | |
| 4,769,276 A | 9/1988 | Gruss et al. | | |
| 5,753,078 A * | 5/1998 | Koutitonsky et al. | ................ | 162/135 |
| 6,103,382 A | 8/2000 | Smith et al. | | |
| 6,153,301 A | 11/2000 | Iwata et al. | | |
| 6,312,561 B1 | 11/2001 | Forsten et al. | | |
| 6,458,244 B1 * | 10/2002 | Wang et al. | ................ | 162/146 |
| 6,551,456 B2 * | 4/2003 | Wang et al. | ................ | 162/146 |
| 6,991,845 B2 * | 1/2006 | Levit et al. | ................ | 428/212 |
| 2005/0155731 A1 * | 7/2005 | Martin et al. | ................ | 162/158 |

FOREIGN PATENT DOCUMENTS

EP 0 373 137 A2 11/1989
RU 2051434 12/1995

OTHER PUBLICATIONS

Database WPI Week 198203, Derwent Publications Ltd., London, GB; AN 1982-04945e, XP002299812 & JP 56 159011 A (Mitsubishi Electric Corp) Dec. 8, 1981 abstract.

Patent Abstracts of Japan, vol. 1996, No. 4, Apr. 30, 1996 & JP 7 320553 A (Showa Electric Wire & Cable Co. Ltd.), Dec. 8, 1995, abstract

* cited by examiner

*Primary Examiner*—José A Fortuna

(57) ABSTRACT

The present invention relates to a sheet structure for electrical insulation or flame resistance comprising a barrier ply having a mica-rich face and a mica-poor face and a reinforcing ply containing a saturable backing layer attached to the mica-poor face of the barrier ply.

4 Claims, No Drawings

PROCESS OF ATTACHING REINFORCING PLY TO PLY CONTAINING MICA-RICH AND MICA-POOR FACES

RELATED APPLICATION

The present paten application is a division of patent application Ser. No. 10/318,964 file Dec. 13, 2002, now U.S. Pat. No. 6,991,845 issued Jan. 31, 2006.

BACKGROUND OF THE INVENTION

1. Field of the Invention

The present invention relates to a sheet structure for electrical insulation or flame resistance comprising a barrier ply having a mica-rich face and a mica-poor face and a reinforcing ply containing a saturable backing layer attached to the mica-poor face of the barrier ply.

2. Description of the Related Art

The use of a mica-based sheets and tapes as an electrical insulating and flame barrier material is well known in the art. Such sheets and tapes typically consist of mica paper glued to a backing of reinforcing material.

U.S. Pat. Nos. 4,286,010, 4,769,276, 6,103,382, 6,153,301, and European Patent Application 0 373 137 A2, disclose the preparation and use of mica sheets and tapes in electrical insulation and flame protection applications. However, mica tapes produced by gluing mica paper to a backing reinforcement have limitations because the glue must be compatible with saturating resins that are commonly applied to the tapes in a subsequent step. The glue must also be thermally stable for extended periods of time. For example, a widely-used combination of backing glass cloth and epoxy resin as a glue limits the end-use temperature of the insulating tape to 180° C., as well as to the possible resins that may be used in the impregnation step (one normally must use the same epoxy resin). Also, the process of gluing of many resins usually involves continuous solvent-based processes and all the technological and safety complications related to dealing with volatile organics (ventilation, recuperation of the solvent and etc.).

An aramid-mica blended paper, made from a homogeneous blend of m-aramid fiber, m-aramid fibrids, and mica is manufactured by DuPont under trade name NOMEX® paper type 418. Such papers are described, for example, in U.S. Pat. No. 6,312,561. Because of superior mechanical properties vs. mica paper, tapes from NOMEX® 418 paper can be used without any backing reinforcement. However, 30-60 weight percent of organic (aramid) components in this barrier material limit its possible corona resistance or voltage endurance. Another limitation is that during vacuum-pressure impregnation of an item insulated with a tape based on this paper, it is necessary to rotate this item until the resin is completely cured because the tape is not readily saturable, that is the tape has no component that can hold uncured resin.

A two-ply paper has also been disclosed in which one ply consists of mica and another ply can consists of aramid, glass, polyester or other fibrous components (Russian Pat. 2051434, 1996). These papers do not have the necessary reinforcement and are relatively weak in sheet form and do not make acceptable narrow-width tapes.

What is needed is a sheet structure containing a high concentration of mica that can be made into tapes and easily saturated with a resin and that has sufficient mechanical properties for use in electrical insulation and flame retardant structures.

SUMMARY OF THE INVENTION

This invention relates to a sheet structure comprising a barrier ply containing a mica-rich face and a mica-poor face, and a reinforcing ply attached to the mica-poor face of the barrier ply, with the reinforcing ply comprising a saturable backing layer. The mica content in the mica-rich face of the barrier ply is at least 60 weight percent based on the total components in the mica-rich face; the mica-poor face contains less than 40 weight percent mica, based on the total components in the mica-poor face; and the saturable backing layer of the reinforcing ply is a spunlaced aramid material. In the preferred embodiment of this invention, the mica-rich face of the barrier ply has greater than 85 weight percent mica by weight based on the total components in the mica-rich face and the mica-poor face has less than 10 weight percent mica based on the total components in the mica-poor face layer. The sheet structure of this invention may also include aramid material in the barrier ply in addition to mica. The amount of mica in the mica-rich and mica-poor faces can be measured in the sheet structure by carefully microtoming or microcutting the various integrated layers from the sheet structure and performing standard analytical techniques to analyze the composition of each layer.

In addition, the sheet structure of this invention can be used to make mica-based tapes and can be combined with matrix resin to make prepregs.

This invention further relates to a process for making a sheet structure comprising the steps of forming of a barrier ply containing a mica-rich face and a mica-poor face and attaching a reinforcing ply containing a saturable backing layer to the mica-poor face of the barrier ply. The barrier ply may be formed on a paper machine, and the mica-rich and mica-poor faces of the barrier ply may be formed by supplying separate mica-rich and mica-poor slurries to the paper machine. Further, the reinforcing ply may be attached to the barrier ply by laminating or calendaring the plies.

DETAILED DESCRIPTION

The present invention provides a mica-based sheet structure, tape, and prepreg that is useful, for example, as an electrical insulation. Further, the present invention may be used as a flame barrier due to a significant content of mica in the composition.

A sheet structure or tape of the present invention comprises at least 30 weight percent of mica on a total weight basis and is comprised of at least one barrier ply and one reinforcing ply. The mica is concentrated in one face or side of the barrier ply with the other face or side of the barrier ply having no or low concentration of mica. By mica-rich it is meant that the face has a mica content of at least 60 percent by weight, based on the total weight of the components in the mica-rich face. By mica-poor it is meant the face has a mica content of less than 40 percent by weight, based on the total weight of the components in the mica-poor face.

While not intended to be limiting as to the method of manufacture, the barrier ply of the present invention may be made on a conventional paper-making machine equipped with two headboxes for forming a layered paper. Two different slurries having the desired proportions of mica and/or other material solids are provided to the two headboxes and the two slurries are then wet-laid as layers onto a papermaking wire with, for example, the mica-poor face being formed on the papermaking wire and the mica-rich face being formed on top of the mica-poor face. This creates a single sheet having an intermingling of the fibrous components at the interface of the mica-rich and mica-poor faces.

Once formed, the barrier ply may then be combined with a separate reinforcing ply, with the reinforcing ply facing the mica-poor face of the barrier ply. The two plies are then attached to each other and preferred methods are to attach the two plies together without adhesive resins or glues by laminating the two plies in the wet press of the papermaking machine or in the nip of a hot roll calender.

The sheet structure or tape of the present invention can have a basis weight from about 30 g/m$^2$ to about 300 g/m$^2$ and a thickness from about 0.02 mm to about 1.0 mm.

The mica-rich face of the barrier ply in mica-based sheet or tape of the current invention contains at least 60 weight percent, and preferably at least 85 weight percent of mica, based on total weight of components in the mica-rich face. Other components of the mica-rich face may include meta-aramid fibrids and other binder materials; and aramid, glass and other fibers, which can be used for the reduction of dusting from mica tape and adjustment of the mechanical properties of the mica-rich ply.

The mica-poor face of the barrier ply can have the same components as the mica-rich face and preferably contains meta-aramid fibrids as a binder along with aramid fiber or other thermostable floc or fiber or mixtures of such flocs or fibers. By thermostable it is meant that the given floc or fiber can withstand a long exposure to the end-use temperature without significant degradation (usually, to remain at least 50% of its initial properties after exposure for 100,000 hours to the necessary temperature. Other thermostable floc or fibers can include, but are not limited to, such fibers as polyesters and polybenzimdiazoles, and fibers and flocs based on fluoropolymers, glass, and silica.

The reinforcing ply of the sheet structure of this invention contains a saturable backing layer which may be a woven, knitted or nonwoven fabric prepared from any thermally stable organic or inorganic fibers or their mixtures of those fibers. Possible fibers include, but not limited to, aramid, polyester, and glass fibers. It is preferred that the reinforcing ply be a spunlaced nonwoven fabric due to the good cushioning properties such fabrics exhibit during winding of the sheet structure, along with the fast and uniform resin pick-up that these nonwoven exhibit during resin impregnation. The reinforcing ply may include other plies or layers to impart other functionality as long as the saturability of the saturable backing layer is not compromised.

As stated previously, the amount of mica in the faces of the barrier ply can be different depending on the particular end-use with the mica-rich face having at least 60 weight percent mica based on the total weight of components in that face, and the mica-poor face portion having less than 40 weight percent of mica based on the total weight of components in that face. Prior to impregnation by a resin, the barrier ply may be between 50 and 95 weight percent based on the total weight of the sheet structure, and the reinforcing ply may be between 5 and 50 weight percent, based on the total weight of sheet structure.

Mica of various types (muscovite or phlogopite, thermochemical or thermomechanical) can be used in the present invention. The optimum type for any particular sheet structure generally depends on the end-use application. Typically, muscovite is preferred for electrical insulation and phlogopite is preferred for flame barriers.

The term "floc", as used herein, means fibers that are cut to a short length and which are customarily used in the preparation of wet-laid sheets. Typically, floc has a length of from about 3 to about 20 millimeters. A preferred length is from about 3 to about 7 millimeters. Aramid floc is a preferred floc used in the mica-rich and mica-poor faces of the barrier ply. Floc is normally produced by cutting continuous fibers into the required lengths using well-known methods in the art.

The term "aramid", as used herein, means aromatic polyamide, wherein at least 85% of the amide (—CONH—) linkages are attached directly to two aromatic rings. Optionally, additives can be used with the aramid and may be dispersed throughout the polymer structure. It has been found that up to as much as about 10 percent by weight of other polymeric material can be blended with the aramid. It has also been found that copolymers can be used having as much as about 10 percent of other diamines substituted for the diamine of the aramid or as much as about 10 percent of other diacid chlorides substituted for the diacid chloride of the aramid.

The term "fibrids", as used herein, means very small, non-granular, fibrous or film-like particles with at least one of their three dimensions being of minor magnitude relative to the largest dimension. These particles are prepared by precipitation of a solution of polymeric material using a non-solvent under high shear. The term "aramid fibrids", as used herein, means non-granular film-like particles of aromatic polyamide having a melting point or decomposition point above 320° C. The fibrids generally have an largest dimension length in the range of about 0.2 mm to about 1 mm with a length-to-width aspect ratio of about 5:1 to about 10:1. The thickness dimension is on the order of a fraction of a micron, for example, about 0.1 microns to about 1.0 micron. While not required, it is preferred to incorporate aramid fibrids into barrier plies while the fibrids are still in a never-dried state. In addition to aromatic polyamide, aramid fibrids can optionally comprise dyes, pigments, and other additives such as antistatic agents, surfactants, or fillers such as carbon black, silica and titanium dioxide.

Either ply of the sheet structure and/or tape of this invention may contain special additives for further improvement of voltage endurance behavior. Such additives can include but are not limited to particles based on silicone dioxide, aluminum oxide, titanium dioxide, zirconium dioxide or their combinations.

The sheet structure and/or tape of this invention, as made, preferably does not contain any adhering resin between the plies, which allows the use of a broad range of resins during impregnation of the sheet or tape to make the final insulation material.

Several methods may be utilized for the preparation of a final resin-impregnated insulation material based on the sheet structure and/or tape of this invention. The first common method comprises impregnating the tape or sheet with resin after it has been inserted into, or wound around, the item to be insulated and then curing the resin. The second common method comprises impregnating the tape or sheet with resin prior to it being inserted into or wound around the item to be insulated and then curing the resin.

It is surprising and unexpected that in the preferred version of this invention the mica-poor face of the barrier ply can provide good bonding between the barrier ply and the reinforcing ply without using any additional adhering resin. It is known in the art that one ply of aramid paper or board can be laminated in a hot calender nip or in the hot press with another ply of aramid paper or board, if both of the plies contain fibrids, moldable fibers or some other bonding agents, as it described, for example, in U.S. Pat. Nos. 4,481,060 and 4,752,355. However, it is unexpected that sufficient bonding and sheet strength can be achieved by lamination of the barrier ply with a reinforcing ply containing a saturable backing material which doesn't contain any fibrids, moldable fibers, or glue; or that the saturable surface will have adequate porosity for further resin-impregnation after such lamination.

As used herein, "prepreg" includes a mica-based sheet or tape impregnated by a resin and having enough formability to be compressed and/or shaped into a final composite. When the sheet or tape is impregnated with a thermoset resin, the resin is usually in a curing stage B (partially soluble) in the prepreg and can be cured additionally to stage C (cross-linked, not soluble) later.

A prepreg based on the mica-based sheet or tape of the present invention can be made by any known technique by the use of a matrix resin solution, dispersion, or melt which will flow into the structure of the present invention. The viscosity of the matrix resin is not especially critical to this invention. If the matrix resin has a very high viscosity it should be dissolved in a solvent to form a solution and then the solution can be used to impregnate the sheet. If a low viscosity matrix resin is utilized, the solution or dispersion is not necessary. For example, low-viscosity epoxy compositions developed for vacuum-pressure impregnation (VPI) are in use in the industry now and can be used with the materials of present invention without any addition of solvents.

TEST METHODS

The following test methods were used in the Examples provided below. The tensile properties of mica-based sheet and tape of the present invention were measured on an Instron-type testing machine using test specimens 2.54 cm wide and a gage length of 18 cm, in accordance with ASTM D 828-93.

The thickness and basis weight of mica-based sheet of present invention were determined by measuring the thickness and the weight of an area of a sample of the test nonwoven sheet in accordance with ASTM D 645/D 645-M-96 and ASTM D 646-96, respectively.

Internal tearing resistance of mica-based sheets was measured in a single sheet in accordance with ASTM D689-96a with the usage of Elmendorf-Type Tearing Tester.

Resin pick-up was determined based on measuring the weight of a mica-based sheet before impregnation and after impregnation and complete curing of a resin. Before each weighing, the material was dried in the oven at 110 C. for 24 hours. Resin pick-up ir weight percent was calculated based on the equation:

{(Wt. After−Wt. Before)/(Wt. After)}×100%,

Where Wt. Before and Wt. After is weight of the material before and after impregnation, respectively.

EXAMPLE

An aqueous dispersion containing a mixture of meta-aramid floc and meta-aramid fibrids was made having a relative content of non-aqueous components (percents by weight) as follows:
  Meta-aramid floc about 60 weight percent,
  Meta-aramid fibrids about 40 weight percent.

Another aqueous dispersion containing a mixture of mica and meta-aramid fibrids was made having a relative content of non-aqueous components (percents by weight) as follows:
  Mica about 95 weight percent,
  Meta-aramid fibrids about 5 weight percent.

The dispersions were pumped through primary and secondary headboxes of a Fourdrinier-type papermaking machine and a layered wet-laid ply was formed with a mica-rich layer on the top and a mica-poor layer containing predominantly aramid components on the bottom. The basis weight of the top layer was about 84.8 g/m2 and basis weight of the bottom layer was about 50.9 g/m2.

The mica used was muscovite type, Electrical Samica Flake (sold by US SAMICA Incorporated, Rutland, Vt., USA).

The meta-aramid fibrids were made from poly(metaphenylene isophthalamide) in a manner generally described in U.S. Pat. No. 3,756,908.

The meta-aramid floc was poly(metaphenylene isophthalamide) floc of linear density 0.22 tex and length of 0.64 cm (sold by E. I. du Pont de Nemours and Company under the trade name NOMEX®).

The layered wet-laid ply formed the barrier ply and was laminated with a reinforcing ply of nonwoven meta-aramid material in the hot nip of a calender at nip pressure of about 3000 N/cm. The temperature of the bottom role (faced to spunlaced material) was about 350° C., and the temperature of the top roll (faced to the mica-rich ply) was about 180° C. The nonwoven meta-aramid material used as the reinforcing ply was poly(metaphenylene isophthalamide) spunlaced fabric having a basis weight of 68 g/m2 (sold by E. I. du Pont de Nemours and Company as NOMEX® spunlaced fabric type E88, style 320).

The resulting mica-based sheet structure had a basis weight about 205 g/m2 and a thickness about 0.208 mm. About 66.1 weight percent of the total weight of the sheet was contained in the barrier ply with a mica content of 95 weight percent in the mica-rich face based on mica-rich face components, and essentially no mica in the mica-poor face. About 33.9 weight percent of the total weight of the sheet was contained in the reinforcing layer. The total mica content of the sheet on a total weigh basis was about 39.2 weight percent. Other properties of the final mica-based sheet are shown in Table 1. A part of the prepared mica-based sheet was then slit into mica-based tapes with width about 12.7 mm. Another part of the mica-based sheet was cut into 20 cm×20 cm pieces and impregnated with a solvent-free low-viscosity epoxy composition type E-833 (sold by P.D. George Co., St. Louis, Mo., USA). To simulate a vacuum-pressure impregnation process, a piece of the sheet was dried in the oven at 110° C. for 24 hours, then impregnated with the resin in a vacuum oven at room temperature with residue pressure of about 5 kPa and, finally, heat treated in a platen press in a multi-step process at constant pressure of about 650 kPa and temperature about 135 C. for 60 min., 156° C. for 120 min., 177° C. for 60 min., and 93° C. for 1 min.

Comparison Example

The barrier ply of the previous example was calendered without the reinforcing material at the same conditions as were used in that example. The calendered paper had thickness of about 0.105 mm. Some other properties are shown in Table 1.

As it can be seen from Table 1, the reinforcing ply of Example 1 provided a significant increase in tensile and tear properties of the mica-based barrier sheet, as well as an increase in resin pick-up. This confirmed that bonding through the mica-poor layer of the barrier ply was adequate, and that the saturable surface of the reinforcing ply was still saturable by resins after the lamination process.

TABLE 1

| Material | Tensile Strength in Machine Direction, N/cm | Initial Tear Resistance in Machine Direction, N | Initial Tear Resistance in Cross Direction, N | Resin Pick-Up During Impregnation, weight percent |
|---|---|---|---|---|
| Example | 41.3 | 13.2 | 14.8 | 47 |
| Comparison Example | 27.1 | 2.0 | 3.0 | 36 |

What is claimed is:

1. A process for making a sheet structure comprising the steps of:
   a.) forming a ply containing a mica-rich face and a mica-poor face; and
   b.) attaching a reinforcing ply to the mica-poor face of the ply of step a), said reinforcing ply comprising a saturable backing layer, wherein the reinforcing ply is attached to the ply of step a) by laminating;
   with the provisos:
   (i) mica is present in both the mica-rich face and mica-poor face,
   (ii) mica in the mica-rich face is present in an amount of at least 60 weight percent based on the total weight of components in the mica-rich face and,
   (iii) mica in the mica-poor face is present in an amount less than 40 weight percent based on the total amount of components in the mica-poor face.

2. The process of claim 1 wherein the ply of step a) is formed on a paper machine.

3. The process of claim 2 wherein the mica-rich and mica-poor faces of the ply of step a) are formed by supplying separate mica-rich and mica-poor slurries to the paper machine.

4. The process of claim 1 wherein the saturable backing layer of the reinforcing ply is a spunlaced material.

* * * * *